United States Patent [19]

Arter et al.

[11] Patent Number: 4,511,785
[45] Date of Patent: Apr. 16, 1985

[54] SEAM TRACKER

[75] Inventors: William L. Arter, Fullerton; Foster R. Williams, Seal Beach, both of Calif.

[73] Assignee: Jetline Engineering, Inc., Irvine, Calif.

[21] Appl. No.: 584,241

[22] Filed: Feb. 27, 1984

[51] Int. Cl.³ .............................................. B23K 9/12
[52] U.S. Cl. ................. 219/124.34; 228/45; 318/575
[58] Field of Search ............ 219/124.34, 124.22; 318/575, 576, 578; 228/45; 200/61.41

[56] References Cited

U.S. PATENT DOCUMENTS

| | | | |
|---|---|---|---|
| 3,171,012 | 2/1965 | Morehead | 219/124.34 |
| 3,408,475 | 10/1968 | Fier | 219/124.34 |
| 3,457,484 | 7/1969 | Shimizu et al. | 318/578 |
| 3,997,757 | 12/1967 | Cecil et al. | 219/124.34 |
| 4,151,394 | 4/1979 | Cecil | 219/124.34 |

FOREIGN PATENT DOCUMENTS

| | | | |
|---|---|---|---|
| 55-36056 | 3/1980 | Japan | 219/124.34 |
| 799923 | 1/1981 | U.S.S.R. | 219/124.34 |

Primary Examiner—Clifford C. Shaw
Attorney, Agent, or Firm—Jackson, Jones & Price

[57] ABSTRACT

A seam tracker in which a shaft containing a position-indicator-member, e.g., a ferromagnetic portion, is attached to a probe, and is mounted on a ball joint and the ball joint is pivotally mounted on a pin the ends of which extend through slots in a housing. Spring means urge the pin ends against one end of the respective slots. A mechanical null position spring urges the shaft to a mechanical null position off of the longitudinal axis of the housing. A means responsive to changes in position of the shaft from an electrical null position along the longitudinal axis of the housing gives an output to drive a control apparatus to correspond to changes in position of the probe represented by changes in position of the shaft.

13 Claims, 5 Drawing Figures

SEAM TRACKER

FIELD OF THE INVENTION

The present invention relates to seam trackers which are included on a welding machine and have a probe which follows the seam or joint to be welded and which includes apparatus for changing the position of the welding head of the welding machine in response to movement of the seam tracker probe.

BACKGROUND OF THE INVENTION

This invention relates generally to a novel seam tracker apparatus. More particularly, this invention is a seam tracker apparatus including a novel and improved means of biasing the seam tracker probe to a selected mechanical null position.

In the past, it has been common to employ seam trackers which contain a probe which is disposed in a seam or joint to be welded and which responds to displacement of the seam tracker probe in either of two directions, horizontally, or vertically. As is known, this is done as the seam tracker probe moves, for example, within the seam or in abutment to the joint being welded, in order that the seam tracker apparatus may produce an output signal representative of the change of the position of the probe, horizontally or vertically. This output signal or signals is employed to modify accordingly the change of position of the welding head such that the welding head remains properly oriented with the seam or joint to ensure proper welding. While such arrangements have exhibited at least a degree of utility in maintaining the welding head in its proper orientation, room for a significant improvement remains.

A welding apparatus containing a seam tracker generally of the type disclosed in the present application is shown in the patent to Cecil et al., U.S. Pat. No. 3,997,757, issued on Dec. 14, 1976. The seam tracker disclosed therein contains a probe which is connected to a shaft extending through a generally cylindrical seam tracker housing (as disclosed to be of a type illustrated in the patent to Morehead, U.S. Pat. No. 3,171,012). The null point of the probe in the Morehead patent, as described in the Cecil patent is along the longitudinal axis of the seam tracker housing. The means for biasing the shaft to the null point consists of a flange on the shaft which is urged against a seat by a coiled spring disposed between the shaft flange and a collar mounted on the interior portion of the housing. Such an arrangement contains problems both in ensuring that the shaft is urged back to its proper null position (which is both a mechanical and electrical null position) when pressure is removed from the probe, and also in allowing slippage of the flange on a seating collar, such that excessive pressure on the probe may distort the orientation of the flange to the seating collar and produce an improper position of the other end of the shaft which contains a means for sensing the position of that other end of the shaft in order to determine the location of the probe with respect to the null position. Moreover, the pressure of the coil spring at various points around the circumference of the portion of the coiled spring abutting the flange will tend to be irregular, so that return to the null point or urging of the shaft back toward the null point as the position of the seam changes may not be totally accurate. Thus, improper indications of the exact position of the probe with respect to the null position may result.

Many of the shortcomings of the prior art seam tracker were overcome by an apparatus invented by Messrs. William Toohey and Franco Ferrari and described in a co-pending application entitled "Seam Tracker," Ser. No. 582,745, filed 2/23/84 ("Toohey application"), assigned to Mr. Larry Russell. The seam tracker apparatus disclosed in the Toohey application included a shaft on which the probe for following the seam in the workpiece is mounted. The shaft is mounted so that the upper end has two degrees of freedom with a mechanical null point. A first coil spring and a sleeve slidably mounted over the shaft supporting unit urges the shaft downward against a pair of stops to provide one null position in one direction of movement, e.g., along the X axis. A second coil spring is used to bias the shaft to a null position along the other axis. The structure is designed to ensure that the shaft returns to its null position when the probe is removed from contact with the workpiece.

It has been discovered, however, that the sleeve tends to rock on the support unit as a result of uneven pressure thereon by the first coil spring and wear. The rocking action creates friction which distorts the response of the apparatus to changes in the seam in the workpiece being followed.

The problems enumerated in the foregoing are not intended to be exhaustive, but rather are among many which tend to impair the effectiveness of previously known seam trackers. Other noteworthy problems may also exist; however, those presented should be sufficient to indicate that seam trackers appearing in the prior art have not been altogether satisfactory.

SUMMARY OF THE INVENTION

Recognizing the need for an improved seam tracker, it is, therefore, a general object of the present invention to provide a novel and improved seam tracker which minimizes or reduces the problems of the type previously noted.

It is a more particular feature of the present invention to provide a seam tracker which includes a structure which positively biases the seam tracker to a mechanical null position, while ensuring that the output signal from the seam tracker accurately portrays the position of the probe relative to the seam being followed.

It is another feature of the present invention to provide a novel and improved seam tracker in which the sensitivity may be varied for different directions of movement.

Examples of the more important features of the present invention have been summarized rather broadly in order that the detailed description thereof that follows may be better understood, and in order that the contribution to the art may be better appreciated. There are, of course, additional features of the invention which will be described hereinafter and which will also form the subject of the appended claims. These other features and advantages of the present invention will become apparent with reference to the following detailed description of the preferred embodiments thereof in connection with the accompanying drawings, wherein like reference numerals have been applied to like elements, in which:

DETAILED DESCRIPTION OF A PREFERRED EMBODIMENT OF THE INVENTION

Figure 1:
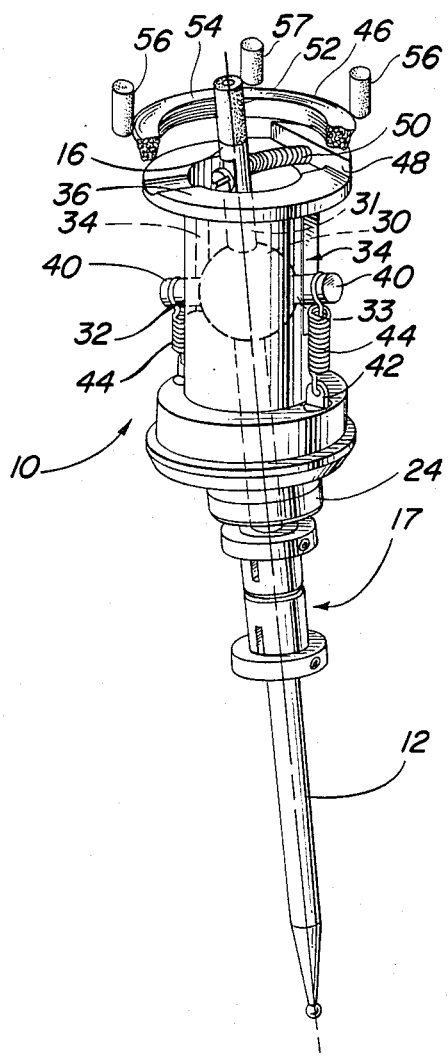
FIG. 1 depicts a perspective view of a preferred embodiment of the present invention showing the seam tracker of the present invention with the housing thereof removed and illustrating the mounting unit of the present invention.
Figure 2:
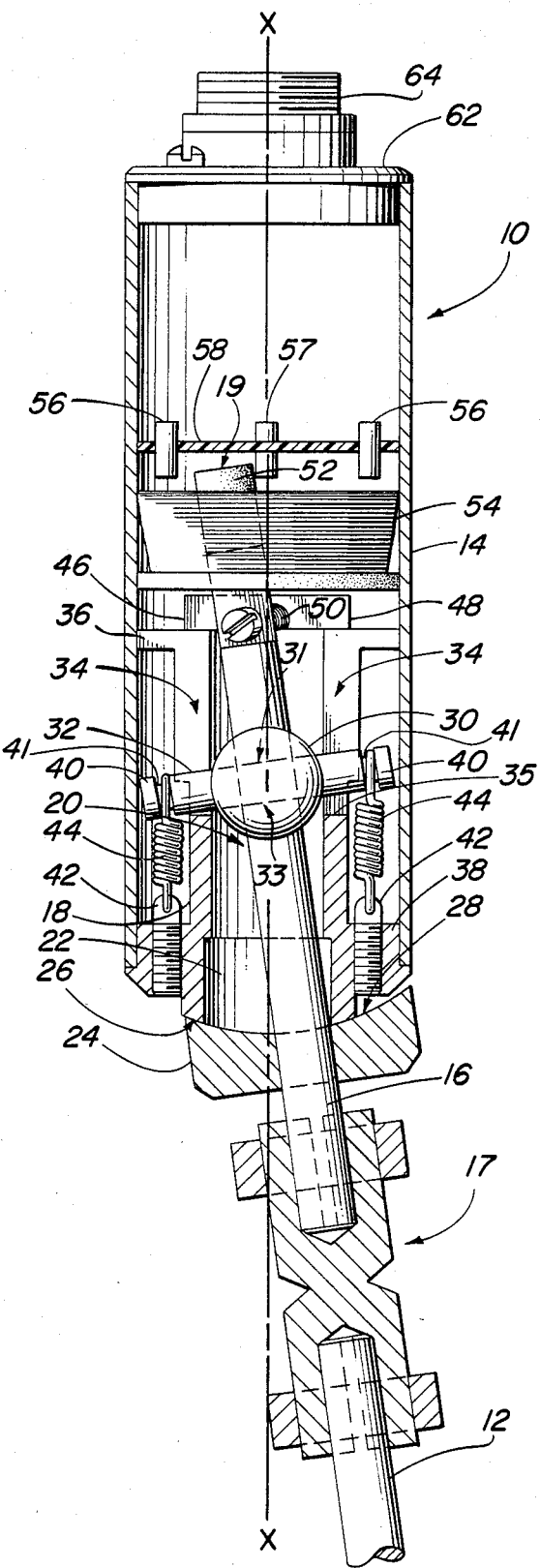
FIG. 2 is a partial cross-section of the seam tracker of the present invention as shown in FIG. 1 in which the housing and mounting unit are shown in cross-section and the remaining features are illustrated as they appear within the housing and/or the mounting unit.

Turning first to FIGS. 1 and 2, there is shown a perspective view and a cross-sectional view of the preferred embodiment of the present invention. FIGS. 1 and 2 show a seam tracker generally designated as 10 having a probe 12. The seam tracker includes a housing 14 which is symmetrically arranged around a longitudinal axis X—X as is shown in FIG. 2. The seam tracker housing 14 (shown in FIG. 2) is removed from the view of FIG. 1 for illustrative purposes. The seam tracker 10 has a shaft 16 which is connected by a coupling 17 to the probe 12. The shaft 16 extends into a seam tracker mounting unit 18 (FIG. 2) which contains an open ended generally cylindrical interior opening 20 through which the shaft 16 passes. The shaft 16 includes an upper end generally indicated at 19, which follows the movement of the probe along the seam of the workpiece to be welded.

As seen in FIG. 2, the end of the interior opening 20 facing the probe 12 and coupler 17, has a region 22 adjacent the lower end of the housing 14 which is of increased diameter over the interior diameter of the generally cylindrical interior opening 20. A fairing 24 is disposed on the shaft 16 intermediate the coupling 17 and the mounting unit 18. The fairing 24 has a concave surface 28 which slidably engages a corresponding curved edge 26 about the cylindrical rim of the portion 22 of the mounting unit 18, when the shaft 16 is in the position of the full extent of its allowable travel in any direction away from alignment with the longitudinal axis of the mounting unit 18, as shown, e.g., in FIG. 2. However, because the shaft 16 displaces slightly downward from its position shown in FIG. 2, when the shaft 16 is aligned with the longitudinal axis (coincident with the axis X—X) of the mounting unit 18, the fairing 24 will be separated from the curved surface 26 of the probe end of the mounting unit 18 in most positions of the shaft 16.

Disposed within the interior opening 20 is a ball joint 30 having an outer diameter generally equal to the inner diameter of the cylindrical opening 20. The ball joint has an interior passage 31 through which the shaft 16 passes. At right angles to the interior passage 31 in the ball joint 30 is another passage 33 through which extends a pin 32. The pin 32 also passes through a passage in the shaft 16, with the pin 32 having an outer diameter smaller than the outer diameter of the shaft 16. The pin 32 extends on either side of the ball joint 30 and is slidably engaged within opposed slots 34 cut in the walls of the mounting unit 18. Each end of the pin 32 has a flange 40 and an annular recess 41. The mounting unit 18 has a probe-end plate 38 in which is mounted a pair of spring-mounting pins 42, each of which engages and holds one end of a coil spring 44. The other end of the coil spring 44 is engaged and held by the flange 40 and the recess 41 on the respective end of the pin 32. Thus, each end of the pin 32 is resiliently urged into abutment with the lower end 35 of the slot 34 closest to the probe 12.

The end of the mounting unit 18 extending furthest into the housing 14 has a flange 36 having an outer diameter generally equal to the inner diameter of the housing 14, and serving to position the mounting unit 18 with its longitudinal axis corresponding to the longitudinal axis of the housing 14. The flange 36 has a protrusion 46 which contains a connecting surface 48 to which is connected a coil spring 50, the opposite end of which is connected to the shaft 16. The connecting point of the spring 50 on the connecting surface 48 is aligned with the center line of the shaft 16 such that the spring 50 resiliently urges the shaft to a mechanical null position at its fullest extent of allowable movement within the housing unit 14 in a direction within a plane perpendicular to the axis of the rotation of the ball joint 30 about the pin 32. As noted above, the ball joint 30 also is rotatable against the resilient urging of the pin 32 to the lower end 35 of the slots, about an axis perpendicular to and intersecting the longitudinal axis of the pin 32. The upper end 19 of the shaft 16 has two degrees of freedom substantially in a plane perpendicular to the longitudinal axis X—X of the housing 14. When the ball joint 30 is rotated about an axis perpendicular to the longitudinal axis of the pin 32, such that one or the other end of the pin 32 is displaced away from the lower end 35 of its associated slot 34, the spring 50 still urges the shaft 16 to a position of fullest allowable extent of travel away from the surface 48 of the protrusion 46. The spring 50 as shown is compressed when the shaft 16 moves out of the mechanical null position. It will be understood also that the spring 50 could just as easily be such as to be under tension when the shaft 16 is moved out of the mechanical null position.

The terminal end of the shaft 16 within the housing 14 is formed of a ferromagnetic material 52. A primary coil 54 containing a number of turns of wire wound on a spool-like member attached to the housing 14. The primary coil surrounds an opening having an inner diameter through which the ferromagnetic material 52 at the upper end of the shaft 16 extends. The inner diameter of the opening is of sufficient size that the ferromagnetic material 52 on the end of the shaft 16 will not contact the primary coil 54 when moved to its maximum allowable extent in any direction.

The housing 14 also contains on the interior thereof a mounting plate 58 made of suitable insulative material on which are mounted two opposing pairs of secondary coils 56 and 57, each consisting of a number of turns of wire. The mounting plate 58 electrically isolates the secondary coils from each other and the housing 14. The first pair of the secondary coils 56 have longitudinal axes arranged in a first plane through which the core 52 passes as the shaft pivots about the axis of the pin 32. The second pair of secondary coils 57 have longitudinal axes arranged in a second plant orthogonal to the first plane and through which the core 52 passes when the shaft and ball joint 30 pivot about an axis perpendicular to the longitudinal axis of the pin 32 as is illustrated.

The seam tracker 10 may be coupled to the welding head (not shown) by means of an end cap 62 which is provided with external threads 64 on the upper end thereof as shown. The end cap 62 is suitably secured to the upper end of the housing 14 by a weld or any other suitable means.

Figure 3:
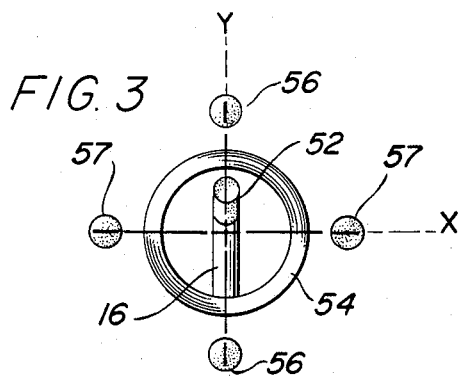
FIG. 3 is a schematic enlarged plan view of the primary and secondary coils of the present invention and the relationship of the ferromagnetic end of the seam tracker shaft to those coils.
Figure 4:
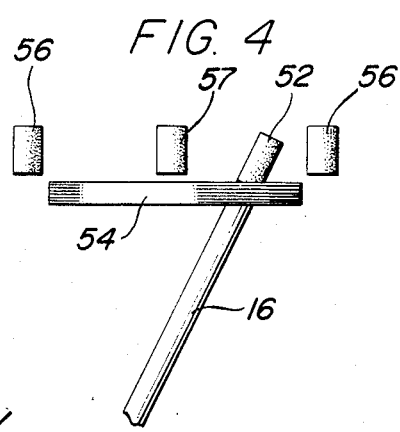
FIG. 4 is a side view of the schematic view of FIG. 3.
Figure 5:
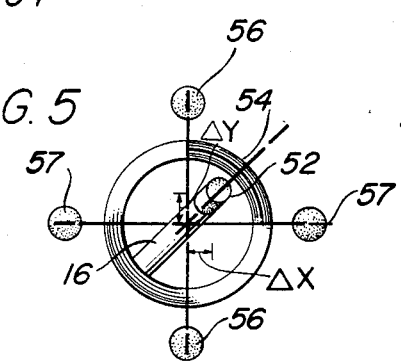
FIG. 5 is the plan view of FIG. 4, showing displacement of the ferromagnetic end of the seam tracker shaft with respect to a selected electrical null position.

The operation of the sensing portion of the seam tracker of the present invention may be understood by reference to FIGS. 3, 4 and 5. In FIG. 3, a plan view which is drawn out of scale and schematic in nature shows the primary coil 54 and secondary coils 56 and 57 with the shaft 16 and ferromagnetic end 52 shown disposed within the interior of the primary coil 54. FIG. 3 illustrates the mechanical null position with the shaft 16 and ferromagnetic end 52 lying in the first mechanical-/electrical null plane arbitrarily defined as the Y axis in the view of FIG. 3, and displaced away from the second electrical null plane, arbitrarily defined as the X axis in the view of FIG. 3, due to the urging of the spring 50. It will be seen by reference to FIG. 2 that the ferromagnetic material 52 extends above the top of the primary coil 54 and into close proximity with the secondary coils 56 and 57. The ferromagnetic material 52 thus provides a magnetic coupling between the primary coil 54 and the secondary coils 56 and 57. When a current is passed through the primary coil 54, current is induced in the secondary coils 56 and 57 due to the magnetic coupling.

The secondary coils 56 and 57 may be connected to any suitable electrical apparatus for detecting this change in relative current, for example, a bridge circuit. Thus, the bridge circuit may be balanced with the ferromagnetic material at the electrical null point. The out-of-balance condition resulting from the movement of the ferromagnetic material 52 towards the secondary coil 56 at, e.g., the top of FIG. 3 is representative of the amount of displacement in the Y axis of the ferromagnetic material 52 away from the electrical null point. Similarly, the secondary coils 57 at the right and left of FIG. 3 may be connected to a bridge circuit, with the bridge circuit being balanced when the ferromagnetic material 52 centerline axis lies at the electrical null point. Displacement of the ferromagnetic material 52 to the right or left of the plane in the Y axis, through the electrical null point, induces a higher current in the secondary coil 57 towards which the ferromagnetic material 52 is displaced, and a correspondingly lower current in the secondary coil 57 away from which the ferromagnetic material 52 is displaced, thus giving an indication of the amount of displacement to either side of the mechanical/electrical null plane in the Y axis.

As shown in FIG. 3, displacement of the ferromagnetic material 52 along the Y axis to the mechanical null position will induce a greater current in the secondary coil 56 at the top of FIG. 3 and a correspondingly lower current in the secondary coil 56 at the bottom of FIG. 3.

It will be seen that when the seam tracker 10 of the present invention is electrically energized and the probe 12 is not in contact with the workpiece, the shaft 16 and the ferromagnetic end 52 will be at the mechanical null position and out of the electrical null position. This induces an error signal to the control unit for the welding head which causes the welding head to move vertically downward to a position which drives the probe 12 on the shaft 16 into engagement with the workpiece and, further, to a point where the ferromagnetic material moves to the electrical null position. At this point the welding head is properly positioned and subsequent movement of the probe 12 will result in a corresponding movement of the welding head.

FIG. 5 shows an illustrative position of the ferromagnetic material as displaced away from the electrical null point, with the out-of-balance of the induced current in the secondary coils 56 at the top and bottom of FIG. 5 being representative of a $\Delta Y$ displacement, and the out-of-balance of the induced current in the secondary coils 57 to the right and left in FIG. 5 being representative of a $\Delta X$ displacement. The signals representative of the $\Delta Y$ and $\Delta X$ displacements may be used in any conventional manner, for example, that shown in the Cecil patent mentioned above.

SUMMARY OF THE ADVANTAGES AND SCOPE OF THE INVENTION

It will be seen that in constructing a seam tracker 10 according to the present invention certain advantages are obtained. The shaft 16 is urged to a mechanical null position by the action of the dual springs 44 in urging the pin 32 to the lower ends 35 of the slots 34 and, in addition, by the resilient urging of the spring 50 on the shaft 16.

The use of a separate spring means (springs 44) to force each of the ends of the pin 32 toward the lower ends 35 of the slots 34 eliminates the loss of system sensitivity caused by the use of the single coil spring and sleeve of the apparatus disclosed in the Toohey application. As a result the seam tracker of the present invention provides a more accurate and reliable output signal from the secondary coils 56 and 57.

Furthermore, one of the springs 44 may be of a higher tension than the other, e.g., 5:1 or 10:1. This is very useful where the probe 12 is used to seek out the seam or butt, particularly a butt, by movement of the probe 12 across the workpiece. Looking at FIG. 2, if the probe 12 is always moved to the left as shown in FIG. 2 in a search mode, the spring 44 on the right as shown in FIG. 2 would be the one with the higher tension. As the probe 12 is moved across the workpiece from right to left as shown in FIG. 2, the added tension on the right-hand spring 44 will tend to insure that when the tip of the probe 12 engages a seam or track it will be positively urged down into the seam or to not slip over the butt, this facilitating initial location of the proper position for the welding head.

The foregoing description of the invention has been directed to a particular preferred embodiment in accordance with the requirements of the Patent Statutes and for the purposes of explanation and illustration. It will be apparent, however, to those skilled in the art that many modifications and changes in both the apparatus and method of the present invention may be made without departing from the scope and spirit of the invention. For example, the position-indicator-system could be modified to position the primary and secondary coils about some other portion of the shaft which contains the position-indicator-member, i.e., ferromagnetic material. For example, the primary and secondary coils could be positioned at the probe-end of the housing, with a corresponding section of the shaft composed of or surrounded by a ferromagnetic material. The primary and secondary coils could also be disposed within the interior of the cylindrical opening of the housing, with suitable stops to prevent unwanted contact by the shaft with the primary coil and/or secondary coils. Further, there may be more than two pairs of secondary coils, with, e.g., three or more electrical null planes, conveniently perhaps four or eight, for generating signals which can be used to determine changes in shaft position. Also, though the combination of the shaft mounting with a position indicating system using primary and secondary coils magnetically linked together has certain advantages, the shaft mounting means of the present invention could also be used with other means of indicating changes in shaft position.

Regarding the springs attached to the pin ends, the apparatus will work equally well with the springs connected between the pin ends and the upper flange of the housing, thereby urging the pins into contact with the upper ends of the respective slots in the housing. These and other modifications will be apparent to those skilled in this art and it is the applicant's intention to cover in the appended claims all such modifications as fall within the spirit and scope of the invention.

What is claimed is:

1. In a welding machine having a seam tracking apparatus, having a probe positioned in, and responsive to relative movement respective to the probe of, a welding zone and a control apparatus for modifying the position of a welding head responsive to an output signal from the seam tracking apparatus, an improved apparatus for generating the output signal responsive to the movement of the probe in either of two possible degrees of freedom, comprising:
   a seam tracker mounting unit having a longitudinal axis, and having an open ended interior opening of generally cylindrical shape with a first and second end and a longitudinal axis corresponding to that of the mounting unit;
   a shaft connected to the probe at one end thereof and extending through the length of the interior opening, with a portion of the shaft forming a position-indicator-member;
   a pin having a longitudinal axis and connected to the shaft with opposing exterior ends thereof extending on either side of the shaft;
   a pair of opposed slots on the mounting unit each disposed to receive a respective one of the ends of the pin; and
   a pair of springs each disposed on the outside of the mounting unit and connected to a respective end of the pin to urge each end of the pin into abutment with an end of the respective slot of each end of the pin, thereby resiliently urging the pin against movement in the slots.

2. The apparatus of claim 1, further comprising:
   a mechanical-null-point spring operatively connected between the mounting unit and the shaft and disposed to urge the shaft to a mechanical null point along an arc in a first plane, corresponding to the fullest allowable movement of the shaft along that arc in the direction of urging by the mechanical-null-point spring.

3. The apparatus of claim 1, further comprising:
   a primary coil disposed about the shaft in the vicinity of the position-indicator member, and having an interior opening with an inner diameter of sufficient size to allow the position-indicator member to move with the shaft to the full extent of the permissible shaft motion, without contacting the primary coil; and
   a plurality of paired secondary coils each positioned such that a first pair of secondary coils each has a longitudinal axis in a first electrical null plane and a second pair of secondary coils each has a longitudinal axis in the second electrical null plane orthogonal to the first electrical null plane and with the secondary coils positioned with respect to the primary coil such that the position-indicator member is able to magnetically couple the primary coil and respective ones of the respective pairs of secondary coils.

4. In a welding machine having a seam tracking apparatus positioned in, and responsive to relative movement respective to the probe of, a welding zone and a control apparatus for modifying the position of a welding head responsive to an output signal from the seam tracking apparatus, an improved apparatus for generating the output signal responsive to the movement of the probe in either of two possible degrees of freedom, comprising:
   a seam tracker mounting unit having a longitudinal axis, and having an open ended interior opening of generally cylindrical shape with a first and a second end and with a longitudinal axis corresponding to the longitudinal axis of the mounting unit;
   a shaft connected to the probe at one end thereof and extending through the first end of the interior opening and through the length of the interior opening, with the end of the shaft disposed at the second end of the interior opening being formed of a ferromagnetic material;
   a ball joint disposed in the interior opening intermediate the first and the second ends of the interior opening, and having an interior passage through which the shaft is engageably passed, and having a pin with the opposing exterior ends of the pin extending from the surface of the ball joint;
   a pair of opposed slots on the mounting unit, each disposed to receive a respective one of the ends of the pin, thereby locking the ball joint to a first degree of motion within the interior opening, about the longitudinal axis of the pin, and thereby defining the allowable motion of the ferromagnetic end of the shaft along an arc in a first plane perpendicular to the longitudinal axis of the pin;
   a pair of springs each disposed on the outside of the mounting unit and connected to a respective end of the pin to urge each of the ends of the pin into abutment with an end of the respective slot of each end of the pin, thereby resiliently urging the pin against movement in the slots;
   a primary coil disposed within the housing at generally the first end of the interior opening, and having an interior opening with an inner diameter of sufficient size to allow the position-indicator member to move with the shaft to the full extent of the permissible shaft motion, without contacting the primary coil; and
   a plurality of paired secondary coils each disposed within the housing and positioned such that a first pair of secondary coils each as a longitudinal axis in a first plane and a second pair of secondary coils each has a longitudinal axis in a second plane orthogonal to the first plane, with the intersection of the first plane and the second plane forming an electrical null point of the shaft in a position with the longitudinal axis of the shaft aligned with the longitudinal axis of the mounting unit.

5. In a welding machine having a seam tracking apparatus, having a probe positioned in, and responsive to relative movement respective to the probe of, a welding zone, and a control apparatus for modifying the position of a welding head responsive to an output signal from the seam tracking apparatus, an improved apparatus for generating the output signal responsive to the movement to the probe in either of two possible degrees of freedom, comprising:

- a seam tracker mounting unit having a longitudinal axis, and having an open ended interior opening of generally cylindrical shape with a first end and a second end, and with a longitudinal axis corresponding to that of the mounting unit;
- a shaft connected to the probe at the first end thereof and extending through one end of the interior opening and through the length of the interior opening, with a portion of the shaft forming a position-indicator member;
- a ball joint disposed in the interior opening intermediate the first end and the second end of the interior opening, and having an interior passage through which the shaft is engageably passed, and having a pin with the opposing exterior ends of the pin extending from the surface of the ball joint; and
- a ball joint mounting means for allowing rotation of the ball joint about the longitudinal axis of the pin and for allowing rotational movement of the ball joint perpendicular to the longitudinal axis of the pin but resiliently urging against such perpendicular rotational movement, the ball joint mounting means including a pair of springs attached between the mounting unit and the respective ends of the pin.

6. The apparatus of claim 5, further comprising:
- a mechanical-null-positioning means for urging the shaft against motion out of a mechanical null position and in a direction of shaft movement responsive to rotation of the ball joint about the longitudinal axis of the pin.

7. In a welding machine having a seam tracking apparatus, having a probe positioned in, said responsive to relative movement respective to the probe of, a welding zone, and a control apparatus for modifying the position of a welding head responsive to an output signal from the seam tracking apparatus, an improved apparatus for generating an output signal responsive to the movement of the probe in either of two possible degrees of freedom, comprising:

- a seam tracker mounting unit having a longitudinal axis, and having an open-ended interior opening of generally cylindrical shape with a first end and a second end, and with a longitudinal axis corresponding to that of the mounting unit;
- a shaft connected to the probe at one end thereof and extending through the first end of the interior opening through the length of the interior opening, with the end of the shaft at the second end of the interior opening forming a position-indicator member;
- a ball joint disposed in the interior opening, intermediate the first end and the second end of the interior opening, and having an interior passage through which the shaft is passed, and having a pin with the opposing exterior ends of the pin extending from the surface of the ball joint;
- a pair of opposed slots on the mounting unit disposed to receive a respective one of the ends of the pin; and
- a pair of springs each disposed on the outside of the mounting unit and connected to a respective end of the pin to urge each end of the pin into abutment with the end of the respective slot of each end of the pin towards the first end of the interior opening, thereby resiliently urging the pin against movement in the slots.

8. The apparatus of claim 7, further comprising:
- a mechanical-null-point spring operatively connected between the mounting unit and the shaft and disposed to urge the shaft to a point along an arc in a plane, perpendicular to the longitudinal axis of the pin, corresponding to the fullest extent of allowable movement of the shaft along that arc in the direction of urging by the mechanical-null-point spring.

9. In a welding machine having a seam tracking apparatus, having a probe positioned in, and responsive to relative movement respective to the probe of, a welding zone and a control apparatus for modifying the position of a welding head responsive to an output signal from the seam tracking apparatus, an improved apparatus for generating an output signal responsive to the movement of the probe in either of two possible degrees of freedom, comprising:

- a seam tracker mounting unit having an open ended interior opening of generally cylindrical shape with a first and a second end, and with a longitudinal axis corresponding to that of the mounting unit;
- a shaft connected to the probe at one end thereof and extending through the first end of the interior opening and through the length of the interior opening, with the end of the shaft disposed on the second end of the interior opening forming a position-indicator member;
- a ball joint disposed in the interior opening, intermediate the first end and the second end of the interior opening, and having an interior passage through which the shaft is engageably passed, and having a pin with the opposing exterior ends of the pin extending from the surface of the ball joint;
- a pair of opposed slots on the mounting unit each disposed to receive a respective one of the ends of the pin;
- a pair of springs disposed on the outside of the mounting unit and connected to a respective end of the pin to urge each end of the pin into abutment with the end of the respective slot of each end of the pin towards the first end of the interior opening, thereby resiliently urging the pin against movement in the slots; and
- a mechanical-null-point spring operatively connected between the shaft and the mounting unit and disposed to urge the shaft to a mechanical null point along an arc in a second plane, perpendicular to the longitudinal axis of the pin, corresponding to the fullest allowable movement of the shaft in the direction of urging by the mechanical-null-point spring.

10. The apparatus of claim 9, further comprising:
- a primary coil disposed at generally the one end of the mounting unit, and having an interior opening with an inner diameter of sufficient size to allow the position-indicator member to move with the shaft to the full extent of the permissible shaft motion, without contacting the primary coil; and a plurality of paired secondary coils each disposed within the housing and positioned such that a first pair of secondary coils each has a longitudinal axis in a first plane and a second pair of secondary coils each has a longitudinal axis in a second plane orthogonal to the first plane, with the intersection of the first plane and the second plane forming an electrical null point of the shaft in a position different from the mechanical-null-point.

11. A seam tracker comprising:

a housing;

a shaft connected at one end to a seam-tracking probe;

a position-indicator member connected to the other end of the probe;

a ball joint between the shaft and the housing;

a pair of slots in the housing;

a pin mounting for the ball joint with the pin ends extending into the slots;

a pair of springs each connected between the housing and a respective end of the pin, and urging the respective end of the pin into contact with an end of the respective slot; and means carried by the housing for detecting the position of the position-indicator member and for generating an output signal representative of said position.

12. The apparatus of claim 11, further comprising:

a mechanical-null-position spring connected between the housing and the shaft and urging the shaft into a mechanical null position at its fullest allowable movement in the direction of urging of the mechanical-null-position spring.

13. The apparatus of claim 12, wherein the means for detecting the position of the position-indicator member comprises:

a primary coil and a plurality of paired secondary coils which produce an output signal from respective pairs of the secondary coils representative of the change of the position-indicator member relative to an electrical null position of the position-indicator member, due to changes in the magnetic coupling between the primary coil and any of the respective secondary coils of the pairs of secondary coils resulting from movement of the position-indicator member, with the electrical null position being different from the mechanical null position.

* * * * *